US009185740B2

(12) United States Patent
Liang et al.

(10) Patent No.: US 9,185,740 B2
(45) Date of Patent: Nov. 10, 2015

(54) METHOD OF AND SYSTEM FOR PERFORMING ACCESS CONTROL AND RADIO RESOURCE MANAGEMENT ENTITY

(71) Applicant: Samsung Electronics Co., Ltd., Suwon-si, Gyeonggi-do (KR)

(72) Inventors: Huarui Liang, Beijing (CN); Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/299,612

(22) Filed: Jun. 9, 2014

(65) Prior Publication Data

US 2014/0364135 A1    Dec. 11, 2014

Related U.S. Application Data

(63) Continuation of application No. 13/263,928, filed as application No. PCT/KR2010/002179 on Apr. 9, 2010, now Pat. No. 8,750,889.

(30) Foreign Application Priority Data

Apr. 10, 2009    (CN) .......................... 2009 1 0131257

(51) Int. Cl.
*H04W 8/18*      (2009.01)
*H04W 76/06*     (2009.01)
*H04W 48/06*     (2009.01)
*H04W 88/02*     (2009.01)
(Continued)

(52) U.S. Cl.
CPC .............. *H04W 76/066* (2013.01); *H04W 8/18* (2013.01); *H04W 48/06* (2013.01); *H04W 88/02* (2013.01); *H04W 36/22* (2013.01); *H04W 84/045* (2013.01)

(58) Field of Classification Search
CPC .................................. H04W 4/08; H04W 8/186
USPC .............. 455/451, 452.1, 515, 434, 509, 411, 455/433, 435.2, 520, 517, 67.11, 552.1, 455/435.1; 370/331, 329, 328
See application file for complete search history.

(56) References Cited

U.S. PATENT DOCUMENTS 8,515,393 B2 *   8/2013   Tiwari et al. .................. 455/411
2008/0267153 A1 *   10/2008   Mukherjee et al. ........... 370/338
2009/0047960 A1    2/2009   Gunnarsson et al.
(Continued)

FOREIGN PATENT DOCUMENTS

CN            101287294 A      10/2008

OTHER PUBLICATIONS

"Support Open Hybrid Access Mode for H(e)Nb", Huawei, 3GPP TSG RAN WG3 Meeting #63bis R3-090807, Mar. 26, 2008.
(Continued)

*Primary Examiner* — John J Lee
(74) *Attorney, Agent, or Firm* — Jefferson IP Law, LLP

(57) ABSTRACT

The present invention discloses a method of and system for performing the access control as well as a radio resource management entity. The method includes: detecting, by a hybrid radio resource management entity, an access control trigger event, determining, by the hybrid radio resource management entity, a non-Closed Subscriber Group (CSG) User Equipment to be removed, and disconnecting, by the hybrid radio resource management entity, the connection with the non-CSG User Equipment to be removed.

44 Claims, 12 Drawing Sheets

(51) Int. Cl.
*H04W 36/22* (2009.01)
*H04W 84/04* (2009.01)

(56) References Cited

U.S. PATENT DOCUMENTS

2009/0086672 A1  4/2009  Gholmieh et al.
2009/0093232 A1  4/2009  Gupta et al.
2010/0238858 A1*  9/2010  Kim et al. .................. 370/328
2011/0268053 A1* 11/2011  Che et al. ................... 370/329

OTHER PUBLICATIONS

"HNB/HeNB Access Control", ZTE, 3GPP TSG SA WG2 Meeting #70 TD S2-090678, Jan. 16, 2009.
"Admission control and rate control for hybrid access mode", Nortel, 3GPP TSG SA WG2 Meeting #71 TD S2-091293, Feb. 20, 2009.

* cited by examiner

METHOD OF AND SYSTEM FOR PERFORMING ACCESS CONTROL AND RADIO RESOURCE MANAGEMENT ENTITY

CROSS REFERENCES TO RELATED APPLICATIONS

This application is a continuation application of a prior application Ser. No. 13/263,928, having a 371(c) date of Oct. 23, 2011, which claimed the benefit under 35 U.S.C. §371 of an International application filed on Apr. 9, 2010 and assigned application number PCT/KR2010/002179, which claimed the benefit of a Chinese patent application filed on Apr. 10, 2009 in the Chinese Intellectual Property Office and assigned Serial number 200910131257.X, the entire disclosures of which are hereby incorporated by reference.

TECHNICAL FIELD

The present invention relates to mobile communication technologies, and more particularly to a method of and system for performing the access control as well as a radio resource management entity.

BACKGROUND

In a mobile communication system, in order to provide specific subscriber groups with better services, it is often necessary to form multiple radio resource management entities (the radio resource management entity is a network entity for managing radio resources and responsible for subscriber equipment access in a radio access network, e.g. base stations of various mobile communication systems) to a closed subscriber group (CSG) for a specific subscriber group. For example, all subscribers within a company or school is a specific subscriber group, and multiple radio resource management entities are formed to a closed subscriber group for the subscriber group to provide a special access service.

The condition is ubiquitous in mobile communication systems that multiple radio resource management entities are formed to a closed subscriber group for a specific user group. To describe the condition more clearly, the description is hereinafter given by taking a long term evolution (LTE) system of system architecture evolution (SAE) for example.

FIG. 1 is a structure diagram illustrating a LTE system. Referring to FIG. 1, in a radio access network of LTE system, radio resource management entities include a macro base station (eNB) and a home base station (HeNB), and alternatively include a HeNB gateway (HeNB GW). The eNB may be connected directly to a mobile management entity (MME) (the mobile management entity is a network entity responsible for setting up radio access bearers in the core network) in the core network; when radio resource management entities include a HeNB GW, the HeNB is connected to an MME by means of the HeNB GW; when radio resource management entities do not include a HeNB GW, the HeNB may be connected to an MME directly.

To provide more abundant services, radio resource management entities in a LTE system provide, taking a HeNB as an example, multiple types of HeNBs including opened type, hybrid type and closed subscriber group type. The opened HeNB has no specific access subscriber group and any User Equipment may be accessed to an opened HeNB. The closed subscriber group HeNB is the foregoing HeNB within a closed subscriber group and it only allows the User Equipments (to simplify the description, the User Equipment within a specific subscriber group is hereinafter referred to as CSG User Equipment), within a specific subscriber group served by the HeNB, to access the network. The hybrid HeNB forms a closed subscriber group in connection with other HeNBs, and allows a CSG User Equipment served by itself to access the network so as to provide the CSG User Equipment with higher quality access services while it may also allow other non-CSG User Equipments (the User Equipments without belonging to the CSG) to access the network.

It can be seen from the above description that, in the existing mobile communication system, not only a radio resource management entity of closed subscriber group is provided by forming multiple radio resource management entities to a closed subscriber group, e.g. a closed subscriber group HeNB, but also a hybrid radio resource management entity, e.g. a hybrid HeNB, may also be provided to provide more abundant services.

DISCLOSURE OF INVENTION

Technical Problem

However, in an actual mobile communication system, a hybrid radio resource management entity can not distinguish the access of the CSG User Equipment served by itself from the access of non-CSG User Equipment; in this way, there is often a condition that a plenty of non-CSG User Equipments are accessed to the hybrid radio resource management entity while CSG User Equipments can not be accessed to the hybrid radio resource management entity. Whereas, the CSG User Equipment is a User Equipment that should be provided a special and higher priority service by the closed subscriber group to which the hybrid radio resource management entity belongs; accordingly, in the case that non-CSG User Equipments occupy overmuch radio resources while CSG User Equipment are impossible to access the network, it is impossible to guarantee the access and service implementation of CSG User Equipment and it is possible to reduce the subscriber satisfaction greatly.

Solution to Problem

In view of the above, the main objective of the present invention is to provide a method of and system for performing the access control as well as a radio resource management entity, which makes that a hybrid radio resource management entity is able to control the access of User Equipment, so as to guarantee the access of CSG User Equipment.

To achieve the above objects, the present invention provides a technical scheme:

a method for performing the access control, comprising:

detecting, by a hybrid radio resource management entity, an access control trigger event;

determining, by the hybrid radio resource management entity, a non-closed subscriber group, CSG, User Equipment to be removed;

disconnecting, by the hybrid radio resource management entity, the connection with the non-CSG User Equipment to be removed.

a hybrid radio resource management entity, comprising:

a trigger module for detecting an access control trigger event, and sending a trigger notification to an information acquiring module after detecting the access control trigger event;

an information acquiring module for determining a non-CSG User Equipment to be removed after receiving a trigger notification, and sending the non-CSG User Equipment to be removed to a connection control module;

a connection control module for disconnecting the connection with the non-CSG User Equipment to be removed.

a system for performing the access control, comprising:

a hybrid radio resource management entity for sending to a mobile management entity a first request carrying the identification of the CSG to which the hybrid radio resource management entity belongs on detecting an access control trigger event, and disconnecting the connection with the non-CSG User Equipment to be removed according to the received non-CSG User Equipment to be removed;

a mobile management entity for determining a non-CSG User Equipment to be removed according to the CSG identification of the first request and the context of the User Equipment accessed to the hybrid radio resource management entity, and sending the non-CSG User Equipment to be removed to the hybrid radio resource management entity.

a system for performing the access control, comprising:

a hybrid radio resource management entity for determining a non-CSG User Equipment to be removed according to the received indicating information about whether the User Equipment is a CSG User Equipment or a non-CSG User Equipment on detecting an access control trigger event, and disconnecting the connection with the non-CSG User Equipment to be removed;

a mobile management entity for acquiring the identification of the CSG to which the hybrid radio resource management entity belongs, determining whether each User Equipment is a CSG User Equipment or a non-CSG User Equipment of the hybrid radio resource management entity according to the acquired CSG identification and an identification list of the CSGs those are accessible to each User Equipment accessed to the hybrid radio resource management entity, and delivering to the hybrid radio resource management entity the determined indicating information about whether each User Equipment is a CSG User Equipment or a non-CSG User Equipment.

a system for performing the access control, comprising:

a hybrid radio resource management entity for determining a non-CSG User Equipment to be removed according to the received indicating information about whether the User Equipment is a CSG User Equipment or a non-CSG User Equipment on detecting an access control trigger event, and disconnecting the connection with the non-CSG User Equipment to be removed;

a User Equipment for determining whether it is a CSG User Equipment or a non-CSG User Equipment of the hybrid radio resource management entity according to its accessible CSG identification list and the identification of the CSG, to which the hybrid radio resource management entity belongs, delivered by the hybrid radio resource management entity, and reporting to the hybrid radio resource management entity the determined indicating information about whether it is a CSG User Equipment or a non-CSG User Equipment of the hybrid radio resource management entity.

Advantageous Effects of Invention

It can be concluded that the present invention has the following advantages:

1. in the present invention, a hybrid radio resource management entity is able to determine a non-CSG User Equipment to be removed, and disconnect the non-CSG User Equipment to be removed, so as to control the access of User Equipment and guarantee the access of the CSG User Equipment served by the hybrid radio resource management entity.

2. further, in the present invention, a hybrid radio resource management entity is able to handover a non-CSG User Equipment to be removed to other radio resource management entities, so as to guarantee the service continuity of the removed non-CSG User Equipment.

MODE FOR THE INVENTION

A further detailed description is hereinafter given to the present invention with reference to embodiments and accompanying drawings so as to make the objectives, technical solution and merits thereof more apparent.

Figure 1:
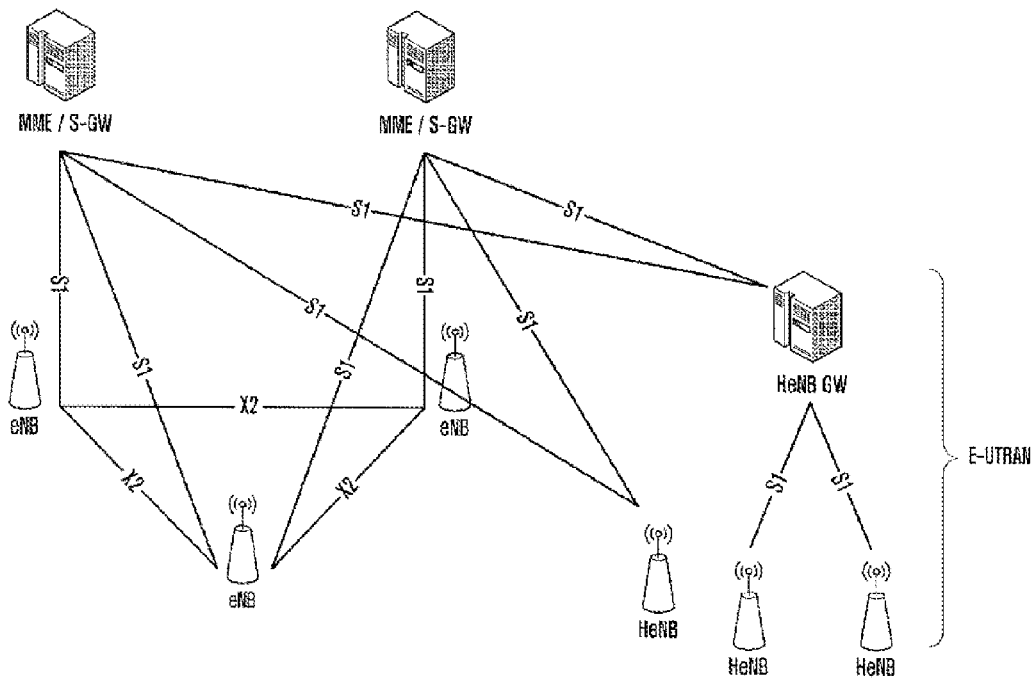
FIG. 1 is a structure diagram illustrating a LTE system.
Figure 2:
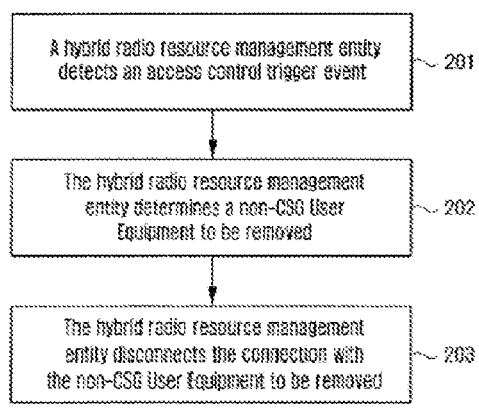
FIG. 2 is a flowchart of a method of a hybrid radio resource management entity performing the access control in accordance with the present invention.

The present invention provides a method of controlling access. Referring to FIG. 2, the core implementing procedure of the method includes the following steps.

Step 201: a hybrid radio resource management entity detects an access control trigger event.

Step 202: the hybrid radio resource management entity determines a non-CSG User Equipment to be removed.

Step 203: the hybrid radio resource management entity disconnects the connection with the non-CSG User Equipment to be removed.

It can be seen from the procedure as shown in FIG. 2, in the present invention, a hybrid radio resource management entity is able to determine a non-CSG User Equipment to be removed, and disconnect the connection with the non-CSG User Equipment to be removed, so as to control the access of User Equipment and guarantee the access priority of the CSG User Equipment served by the hybrid radio resource management entity.

In a detailed service implementation, an event triggering the access control in the present invention may be determined according to the demand of practical service implementation, i.e. the implementation of the above step 201 includes, but is not limited to, the following conditions.

Condition 1: the hybrid radio resource management entity considers detecting an access control trigger event as long as it detects that the current load reaches a preset load threshold, and triggers to execute the subsequent access control processing;

Condition 2: the hybrid radio resource management entity considers detecting an access control trigger event as long as it detects that there is an event for triggering to set up a new connection and the detected current load reaches a preset load threshold, and triggers to execute the subsequent access control processing;

In the condition 2, the event for triggering to set up a new connection may be any event capable of triggering a hybrid radio resource management entity to set up a new connection between the hybrid radio resource management entity and a User Equipment in a mobile communication system, for example, any one or any combination of the following: a new User Equipment needs to access the hybrid radio resource management entity, a new User Equipment needs to be handovered to the hybrid radio resource management entity and a User Equipment accessed to the hybrid radio resource management entity needs to set up a new service.

Condition 3: after receiving an access control trigger indication, the hybrid radio resource management entity considers detecting an access control trigger event, and triggers to execute the subsequent access control processing.

As can be seen, in the above condition 1 and condition 2, the subsequent access controls are triggered when the load of hybrid radio resource management entity reaches a preset load threshold, which accords with the service implementing feature of hybrid radio resource management entity very much, i.e. capable of providing CSG User Equipments and non-CSG User Equipments with access services at the same time; when the load of hybrid radio resource management entity reaches a preset load threshold, however, the access priority of CSG User Equipment is guaranteed. In the above condition 3, an access control trigger indication or handover notification indication is sent to a hybrid radio resource management entity, directly or by means of other network equipments according to the demand of practical service, to trigger the hybrid radio resource management entity to execute the access control, which makes there are a stronger controllability and service implementing flexibility in accordance with the present invention.

In a detailed service implementation, the method for a hybrid radio resource management entity determining a non-CSG User Equipment to be removed, i.e. the implementation of step 202, includes, but is not limited to, the following implementing modes.

Mode 1: a mobile management entity determines a non-CSG User Equipment to be removed, and a hybrid radio resource management entity determines a non-CSG User Equipment to be removed according to a notification sent by the mobile management entity.

In a mobile communication system, a context of User Equipments is saved in a mobile management entity; the context indicates an identification list of the CSGs those are accessible to the User Equipment. Therefore, a hybrid radio resource management entity is able to determine a non-CSG User Equipment to be removed by use of the feature according to the procedure of mode 1 in the present invention, and the detailed implementing procedure is as follows.

1) a hybrid radio resource management entity sends to a mobile management entity a first request carrying the identification of the CSG to which the hybrid radio resource management entity belongs;

2) the mobile management entity searches the contexts of various User Equipments accessed to the hybrid radio resource management entity according to the CSG identification carried by the first request, determines the searched User Equipments without belonging to the CSG as the non-CSG User Equipments to be removed, and sends to the hybrid radio resource management entity a first notification carrying the non-CSG User Equipments to be removed;

If the triggering condition is the above condition 2, the hybrid radio resource management entity may use an initial UE message, handover request acknowledging message or uplink NAS transmitting message, generated in the above condition 2, as the first request; at this point, the 2) procedure may also be replaced, for example, the mobile management entity searches the context of the User Equipment to be accessed currently; if the identification list of the CSGs, those are accessible to the UE, corresponding to the context does not include the CSG identification of the initial UE message, handover request acknowledging message or uplink NAS transmitting message, the User Equipment to be accessed currently is determined as a non-CSG User Equipment to be removed; a UE context release command, served as the first notification, is sent to the hybrid radio resource management entity.

3) the hybrid radio resource management entity determines the non-CSG User Equipment to be removed according to the first notification.

Mode 2: a hybrid radio resource management entity acquires the information that whether each accessed User Equipment belongs to a CSG User Equipment or a non-CSG User Equipment in advance, and determines a non-CSG User Equipment to be removed directly according to the acquired information.

In a mobile communication system, a context of User Equipment is saved in both the User Equipment and a mobile management entity; the context includes an identification list of the CSGs those are accessible to the User Equipment. Accordingly, a hybrid radio resource management entity is able to determine a non-CSG User Equipment to be removed by use of the feature according to the procedure of mode 2 in the present invention, and the detailed implementing procedure is as follows.

An implementing procedure is as follows: each User Equipment determines whether it is a CSG User Equipment or a non-CSG User Equipment of a hybrid radio resource management entity according to its saved accessible CSG identification list and the identification of the CSG, to which the current cell belongs, delivered by the hybrid radio resource management entity, and reports to (e.g. reporting on accessing) the hybrid radio resource management entity the determined information about whether it belongs to a CSG User Equipment or a non-CSG User Equipment of the hybrid radio resource management entity; accordingly, the hybrid radio resource management entity is able to acquire the information about whether each accessed User Equipment belongs to a CSG User Equipment or a non-CSG User Equipment, and finally determines a non-CSG User Equipment to be removed.

Another implementing procedure is as follows: when a User Equipment accesses a hybrid radio resource management entity, a mobile management entity determines whether the User Equipment is a CSG User Equipment or a non-CSG User Equipment of the hybrid radio resource management entity according to its saved identification list of the CSGs those are accessible to the User Equipment and the identification of the CSG, to which the hybrid radio resource management entity belongs, reported by the hybrid radio resource management entity, and delivers to the hybrid radio resource management entity the determined information about whether the User Equipment belongs to a CSG User Equipment or a non-CSG User Equipment of the hybrid radio resource management entity; accordingly, the hybrid radio resource management entity is able to acquire the information about whether each accessed User Equipment belongs to a CSG User Equipment or a non-CSG User Equipment, and finally determines a non-CSG User Equipment to be removed.

In a detailed service implementation of the above step 203, a hybrid radio resource management entity may use any service processing mode capable of disconnecting the connection with a non-CSG User Equipment to be removed, for example, directly releasing the connection between the hybrid radio resource management unit and the non-CSG User Equipment to be removed, for another example, releasing a part of bearers of the non-CSG User Equipment to be removed, for yet another example, directly handovering the non-CSG User Equipment to be removed to other radio resource management entities.

The detailed service implementing procedure of the present invention is hereinafter described by respectively taking a detailed embodiment for the above mode 1 and mode 2 of a hybrid radio resource management entity determining a non-CSG User Equipment to be removed.

To simplify the description, in the following all embodiments, the description is given by supposing that a hybrid radio resource management entity is a hybrid HeNB in a LTE system and a mobile management entity is an MME in a LTE system.

Various embodiments of mode 1 include the following embodiments 1-6.

Embodiment 1

The service condition of embodiment 1 is that, a new CSG User Equipment is accessed to a hybrid HeNB.

Figure 3:
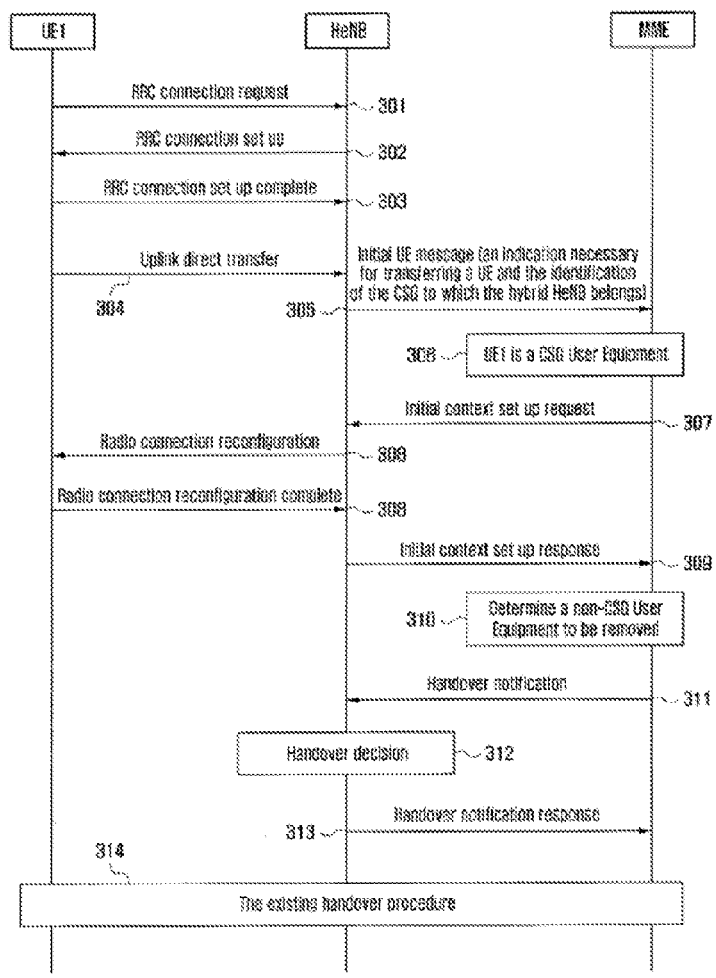
FIG. 3 is a flowchart of a hybrid HeNB performing the access control in accordance with embodiment 1 of the present invention.

FIG. 3 is a flowchart of a hybrid HeNB performing the access control in accordance with embodiment 1 of the present invention. Referring to FIG. 3, when a new CSG User Equipment (referred to as UE1) is accessed to a hybrid HeNB to cause that the load of the hybrid HeNB reaches a load threshold and it is necessary for removing a non-CSG User Equipment, the detailed processing procedure includes the following steps.

The processing of steps 301-304 is the prior art, i.e. it is the same as the corresponding processing of the existing User Equipment accessing procedure, which includes the following steps.

Step 301: UE1 sends a RRC connection request message to a hybrid HeNB.

Step 302: the hybrid HeNB sends a RRC connection set up message to UE1.

Step 303: UE1 sends a RRC connection set up complete message to the hybrid HeNB.

Step 304: UE1 sends an uplink non access stratum (NAS) message to the hybrid HeNB by means of an uplink direct transfer message.

If the uplink NAS message sent by UE1 is a service request, the service request message should be carried in the RRC connection set up complete message of step 303, and step 304 is needless.

At this point, the hybrid HeNB may determine that a new UE needs to access the hybrid HeNB currently.

Step 305: after detecting that the current load reaches a preset load threshold, the hybrid HeNB sends to its connected MME an initial UE message carrying the identification of the CSG (CSG ID) to which the hybrid HeNB belongs.

On executing this step, the hybrid HeNB has determined that a new UE needs to access the hybrid HeNB currently and the current load reaches a preset load threshold; accordingly, it can be regarded that an access control trigger event is detected, and the subsequent access control processing is trigger to be executed, which includes using the existing initial UE message as a first request of the above mode 1 so as to send the identification of the CSG, to which the hybrid HeNB belongs, to the MME served as a mobile management entity.

In this step, the initial UE message may further carry the access type of the hybrid HeNB (e.g. closed subscriber group type or hybrid type).

In this step, the initial UE message may also further carry an indication that the hybrid HeNB needs to transfer a UE.

Step 306: the MME detects the context information of UE1 according to the indication necessary for transferring a UE and a CSG ID carried by the initial UE message; if there is the CSG ID of the initial UE message in the accessible CSG identification list carried by the context information of UE1, the MME allows UE1 to access the hybrid HeNB. If it receives an indication necessary for transferring a UE from the HeNB and the current UEs accessed to the HeNB are all CSG User Equipments, the MME rejects the access of the UE, which is regarded as an implementation mode. The rejecting procedure is the same as the prior art (e.g. step 407 and step 408), and the detailed technical description is omitted herein. If it receives an indication necessary for transferring a UE from the HeNB and there is a non-CSG User Equipment in the current UEs accessed to the HeNB, the MME accepts the access of the UE, which is regarded as an implementation mode. Proceed to step 307.

Since the condition of this embodiment is that, UE1 is a CSG User Equipment of the CSG to which the hybrid HeNB belongs, there is the CSG ID, i.e. the identification of the CSG to which the hybrid HeNB belongs, of the initial UE message in the accessible CSG identification list in this step.

Step 307: the MME sends an initial context set up request message to the hybrid HeNB.

Step 308: the hybrid HeNB sends a radio connection reconfiguration message to
UE1; UE1 configures a radio bearer according to the information of the message, and sends a radio connection reconfiguration complete message to the hybrid HeNB.

Step 309: the hybrid HeNB sends an initial context set up response message to the MME.

So far, a CSG User Equipment UE1 is accessed to a hybrid HeNB. However, since the hybrid HeNB has detected an access control trigger event, it is necessary for executing the subsequent processing for removing a non-CSG User Equipment.

Step 310: the MME searches the context information of each UE accessed to the hybrid HeNB to find the User Equipments (i.e. non-CSG User Equipment) without belonging to the CSG to which the hybrid HeNB belongs, and determines a non-CSG User Equipment to be removed according to the searched User Equipments without belonging to the CSG.

In this step, the context information of each UE includes an identification list of the CSGs those are accessible to the UE; accordingly, if there is not the CSG ID of the initial UE message in an identification list of the CSGs those are accessible to a UE, the UE does not belong to a User Equipment of the CSG to which the hybrid HeNB belongs, i.e. it is a non-CSG User Equipment.

On determining a non-CSG User Equipment to be removed, an MME may directly determine that all User Equipments, without belonging to the CSG to which the hybrid HeNB belongs, are non-CSG User Equipments to be removed. Certainly, if multiple User Equipments, without belonging to the CSG to which the hybrid HeNB belongs (i.e. non-CSG User Equipment), are searched, the MME may also determine only to remove a part of non-CSG User Equipments according to the priorities of subscription information of multiple User Equipments; for example, a part of non-CSG User Equipments, of which the priorities are relatively low, are determined as non-CSG User Equipments to be removed.

Step 311: the MME sends a handover notification message carrying the information of the non-CSG User Equipments to be removed to the hybrid HeNB to trigger a handovering procedure.

In this step, a handover notification message is used as the first notification of the above mode 1.

The handover notification message may carry an information element-reason, and the reason value is set as: transferring non-CSG User Equipments to reduce the load.

In this step, the handover notification message may be the existing UE association signaling; at this point, if there are multiple non-CSG User Equipments, to be removed, determined by the MME, the MME constructs and sends a handover notification message corresponding to each non-CSG User Equipment to be removed; each handover notification message carries the identification of the non-CSG User Equipment to be removed which can be represented by use of the existing identifying mode, such as MME UE S1 AP ID.

In addition, the handover notification message may also be a non UE association signaling, e.g. a new defined signaling; at this point, if there are multiple non-CSG User Equipments, to be removed, determined by the MME, the MME may directly carry the identifications of the multiple non-CSG User Equipment in a handover notification message, such as the identifying mode may be multiple MME UE S1 AP IDs.

It should be noted that, there is not a fixed order between the procedure of the above steps 310-311 and the procedure of the above steps 307-309. For example, the MME may first send an initial context set up request to the hybrid HeNB, and then execute step 310 and send a handover notification message to the hybrid HeNB; alternatively, the MME may also first execute step 310 and send a handover notification message to the hybrid HeNB, and then send an initial context set up request to the hybrid HeNB.

Step 312: the hybrid HeNB initiates the handover procedure of the non-CSG User Equipment to be removed according to the measurement report of the non-CSG User Equipment to be removed.

In this step, if there are multiple non-CSG User Equipments to be removed, the hybrid HeNB may determine to only initiate a handover procedure for a part of non-CSG User Equipments according to the load condition.

Step 313: optionally, the hybrid HeNB sends a handover notification response message to the MME.

In this step, if it needs to remove non-CSG User Equipments again according to the practical processing condition, the hybrid HeNB may carry a re-removing User Equipment indication in the handover notification response message so as to trigger the MME to execute the processing of step 310 again.

In this step, the handover notification response message may carry information elements such as the indication of the load reaching a satisfactory degree, the indication that the load does not reach a satisfactory degree and it is necessary for removing non-CSG User Equipments again, or the information about whether to handover a UE. If the handover is not executed, the handover notification response message may further carry the reason that the handover is not executed, for example the load is an acceptable state or there is not an available neighbor cell.

The type of handover notification response message is the same as that of handover notification message, and they may be UE association signaling or non UE association signaling. In accordance with non UE association signaling, optionally, the handover notification response message may further carry a list of the UEs those are not handovered and the reason that each UE is not handovered, for example the load is an acceptable state or there is not an available neighbor cell.

In accordance with the reason that there is not an available neighbor cell, the MME may initiate a procedure for releasing the UE context; the releasing procedure is the same as the prior art, and the detailed technical description is omitted herein.

If the failed reason is there is not an available neighbor cell and the load does not reach an satisfactory degree, the MME may initiate a handover procedure for other UEs, which is an implementing mode of MME.

Step 314: proceed to the existing handover procedure.

Embodiment 2

The service condition of embodiment 2 is that, a new non-CSG User Equipment is accessed to a hybrid HeNB.

Figure 4:
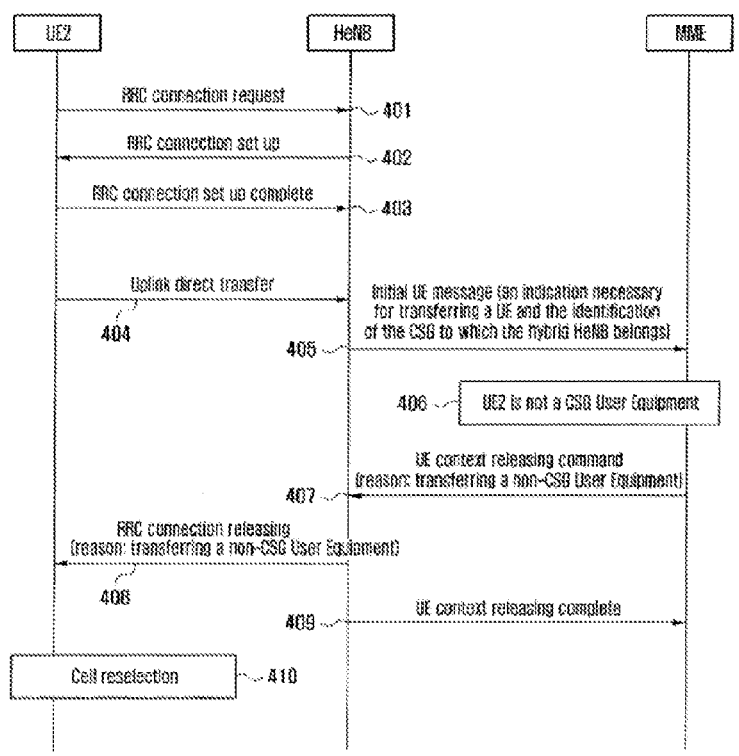
FIG. 4 is a flowchart of a hybrid HeNB performing the access control in accordance with embodiment 2 of the present invention.

FIG. 4 is a flowchart of a hybrid HeNB performing the access control in accordance with embodiment 2 of the present invention. Referring to FIG. 4, when a new non-CSG User Equipment (referred to as UE2) is accessed to a hybrid HeNB to cause that the load of the hybrid HeNB reaches a load threshold and it is necessary for removing a non-CSG User Equipment, the detailed processing procedure includes the following steps.

Steps 401-405 are the same as steps 301-305 except for replacing UE1 by UE2.

Step 406: the MME detects the context information of UE2 according to the indication necessary for transferring a UE and a CSG ID carried by the initial UE message; if there is not the CSG ID of the initial UE message in the accessible CSG identification list carried by the context information of UE2, the MME rejects UE2 to access the hybrid HeNB.

Since the condition of this embodiment is that, UE2 is not a CSG User Equipment of the CSG to which the hybrid HeNB belongs, there is not the CSG ID, i.e. the identification of the CSG to which the hybrid HeNB belongs, of the initial UE message in the accessible CSG identification list in this step.

Step 407: the MME sends a UE context releasing request message to the hybrid HeNB. The message carries a reason such as transferring a non-CSG User Equipment.

Step 408: the hybrid HeNB sends a RRC connection releasing message to UE2; the message carries a reason such as transferring a non-CSG User Equipment.

Step 409: the hybrid HeNB sends a UE context releasing complete message to the MME.

Step 410: after receiving the RRC connection releasing message, UE2 disconnects the connection with the hybrid HeNB, and performs the cell reselection.

Embodiment 3

The service condition of embodiment 3 is that, a new CSG User Equipment needs to be handovered to a hybrid HeNB.

Figure 5:
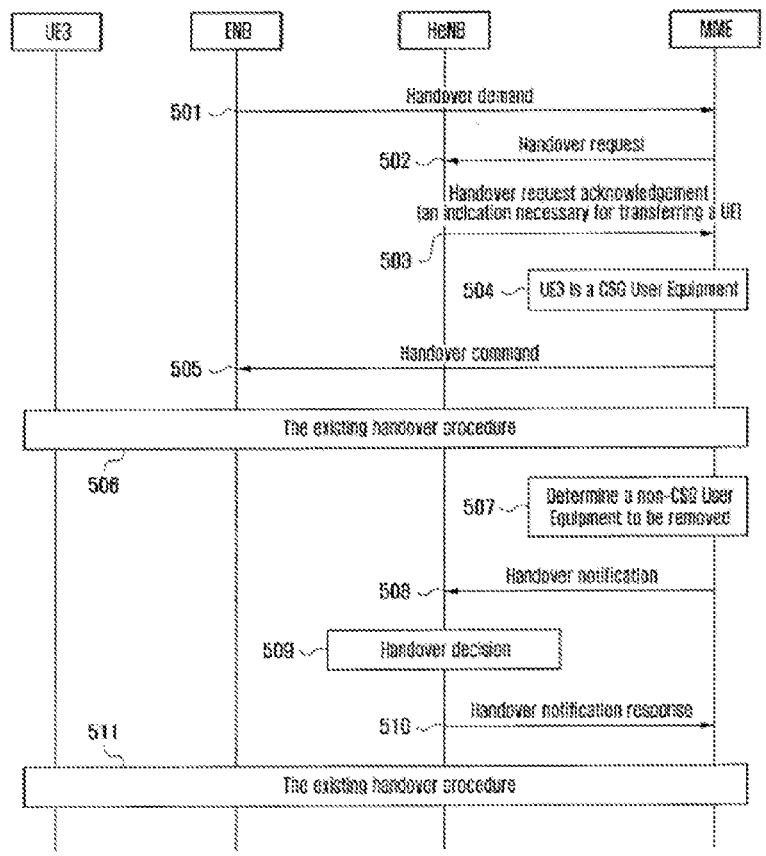
FIG. 5 is a flowchart of a hybrid HeNB performing the access control in accordance with embodiment 3 of the present invention.

FIG. 5 is a flowchart of a hybrid HeNB performing the access control in accordance with embodiment 3 of the present invention. Referring to FIG. 5, when a new CSG User Equipment (referred to as UE3) needs to be handovered from an eNB to a hybrid HeNB, the detailed processing procedure includes the following steps.

Step 501: a source eNB initially connected to UE3 send a handover demand message to an MME.

Step 502: the MME sends a handover request message to a hybrid HeNB.

Step 503: after detecting that the current load reaches a preset load threshold, the hybrid HeNB sends to the MME a handover request acknowledgement message carrying the identification of the CSG (CSG ID) to which the hybrid HeNB belongs.

On executing this step, the hybrid HeNB has determined that a new UE needs to be handovered to the hybrid HeNB currently and the current load reaches a preset load threshold; accordingly, it can be regarded that an access control trigger event is detected, and the subsequent access control processing is trigger to be executed, which includes using the existing handover request acknowledgement message as a first request of the above mode 1 so as to send the identification of the CSG, to which the hybrid HeNB belongs, to the MME served as a mobile management entity.

In this step, the handover request acknowledgement message may further carry the access type of the hybrid HeNB (e.g. closed subscriber group type or hybrid type).

In this step, the handover request acknowledgement message may also further carry an indication that the hybrid HeNB needs to transfer a UE.

Step 504: the MME detects the context information of UE3 according to the indication necessary for transferring a UE and a CSG ID carried by the handover request acknowledgement message; if there is the CSG ID of the initial UE message in the accessible CSG identification list carried by the context information of UE3, the MME allows UE3 to be handovered to the hybrid HeNB. If it receives an indication necessary for transferring a UE from the HeNB and the current UEs accessed to the HeNB are all CSG User Equipments, the MME reject the access of the UE, which is regarded as an implementation mode. The rejecting procedure is the same as the prior art (e.g. step 605 and step 606), and the detailed technical description is omitted herein. If it receives an indication necessary for transferring a UE from the HeNB and there is a non-CSG User Equipment in the current UEs accessed to the HeNB, the MME accepts the access of the UE, which is regarded as an implementation mode. Proceed to step 505.

Step 505: the MME sends a handover command message to the source eNB.

Step 506: proceed to the existing handover procedure.

Steps 507-511 are the same as Steps 310-314.

There is not a fixed order between the procedure of the above steps 507-510 and the procedure of the above steps 505-506. For example, the MME may first send a handover command to the source eNB, and then execute step 507 and send a handover notification to the hybrid HeNB; alternatively, the MME may also first execute step 507 and send a handover notification to the hybrid HeNB, and then send a handover command to the source eNB.

Embodiment 4

The service condition of embodiment 4 is that, a new non-CSG User Equipment needs to be handovered to a hybrid HeNB.

Figure 6:
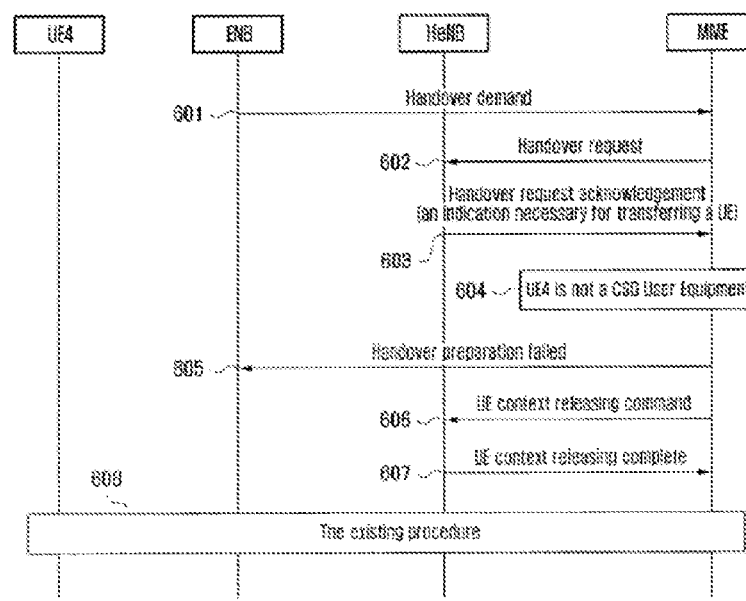
FIG. 6 is a flowchart of a hybrid HeNB performing the access control in accordance with embodiment 4 of the present invention.

FIG. 6 is a flowchart of a hybrid HeNB performing the access control in accordance with embodiment 4 of the present invention. Referring to FIG. 6, when a new non-CSG User Equipment (referred to as UE4) needs to be handovered from an eNB to a hybrid HeNB, the detailed processing procedure includes the following steps.

Steps 601-603 are the same as steps 501-503 except for replacing UE3 by UE4.

Step 604: the MME detects the context information of UE4 according to the indication necessary for transferring a UE and a CSG ID carried by the handover request acknowledgement message; if there is not the CSG ID of the initial UE message in the accessible CSG identification list carried by the context information of UE4, the MME rejects UE4 to be handovered to the hybrid HeNB.

Step 605: the MME sends a handover preparation failed message to the source eNB.

Step 606: the MME sends a UE context releasing command message to the hybrid HeNB for releasing the resource. The reason value is: releasing a non-CSG UE because the resource is limited.

Step 607: the hybrid HeNB sends a UE context releasing complete message to the MME.

Step 608: the subsequent procedure is the same as the prior art, for example the source eNB initiates a procedure for handovering the UE to other cells, and the detailed technical description is omitted herein.

Embodiment 5

The service condition of embodiment 5 is that, a CSG User Equipment accessed to a hybrid HeNB needs to set up a new service.

Figure 7:
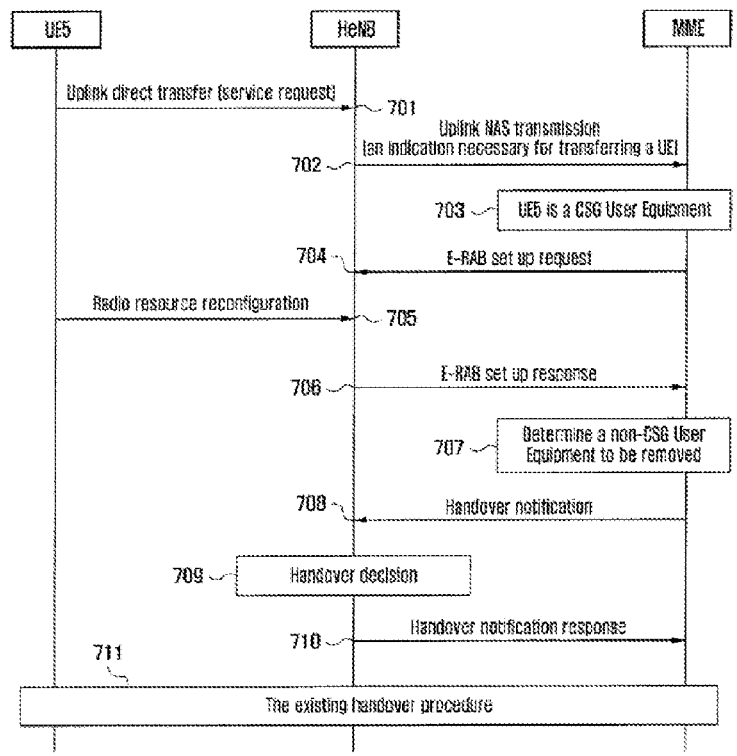
FIG. 7 is a flowchart of a hybrid HeNB performing the access control in accordance with embodiment 5 of the present invention.

FIG. 7 is a flowchart of a hybrid HeNB performing the access control in accordance with embodiment 5 of the present invention. Referring to FIG. 7, when a CSG User Equipment (referred to as UE5) accessed to a hybrid HeNB needs to set up a new service to cause that the load of the hybrid HeNB reaches a load threshold and it is necessary for removing a non-CSG User Equipment, the detailed processing procedure includes the following steps.

Step 701: UE5 sends an uplink direct transfer message to a hybrid HeNB. The message carries a NAS message service request.

Step 702: after detecting that the current load reaches a preset load threshold, the hybrid HeNB sends to its connected MME an uplink NAS transmission message carrying the identification of the CSG (CSG ID) to which the hybrid HeNB belongs.

On executing this step, the hybrid HeNB has determined that a User Equipment accessed to the hybrid HeNB needs to set up a new service currently and the current load reaches a preset load threshold; accordingly, it can be regarded that an access control trigger event is detected, and the subsequent access control processing is trigger to be executed, which includes using the existing uplink NAS transmission message as a first request of the above mode 1 so as to send the identification of the CSG, to which the hybrid HeNB belongs, to the MME served as a mobile management entity.

In this step, the uplink NAS transmission message may further carry the access type of the hybrid HeNB (e.g. closed subscriber group type or hybrid type).

In this step, the uplink NAS transmission message may also further carry an indication that the hybrid HeNB needs to transfer a UE.

Step 703: the MME detects the context information of UE5 according to the indication necessary for transferring a UE and a CSG ID carried by the uplink NAS transmission message; if there is the CSG ID of the uplink NAS transmission message in the accessible CSG identification list carried by the context information of UE5, the MME allows UE5 to access the hybrid HeNB. If it receives an indication necessary for transferring a UE from the HeNB and the current UEs accessed to the HeNB are all CSG User Equipments, the MME reject the access of the UE, which is regarded as an implementation mode. The rejecting procedure is the same as the prior art (e.g. step 804), and the detailed technical description is omitted herein. If it receives an indication necessary for transferring a UE from the HeNB and there is a non-CSG User Equipment in the current UEs accessed to the HeNB, the MME accepts the access of the UE, which is regarded as an implementation mode. Proceed to step 704.

Step 704: the MME sends an E-RAB set up request message to the hybrid HeNB.

Step 705: the hybrid HeNB sends a radio connection reconfiguration message to UE5; UE5 configures a radio bearer according to the information of the message, and sends a radio connection reconfiguration complete message to the hybrid HeNB.

Step 706: the hybrid HeNB sends an E-RAB set up response message to the MME.

Steps 707-711 are the same as Steps 310-314.

There is not a fixed order between the procedure of the above steps 707-711 and the procedure of the above steps 704-706. For example, the MME may first send an E-RAB set up request to the hybrid HeNB, and then execute step 707 and send a handover notification to the hybrid HeNB; alternatively, the MME may also first execute step 707 and send a handover notification to the hybrid HeNB, and then send an E-RAB set up request to the hybrid HeNB.

Embodiment 6

The service condition of embodiment 6 is that, a non-CSG User Equipment accessed to a hybrid HeNB needs to set up a new service.

Figure 8:
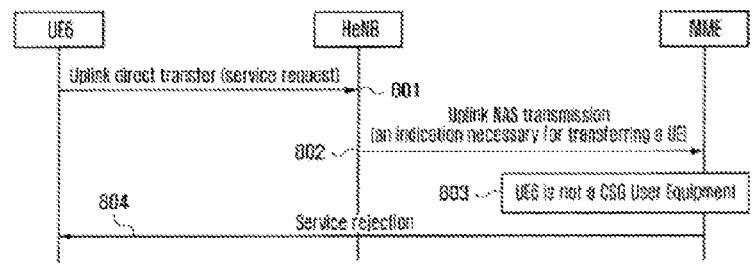
FIG. 8 is a flowchart of a hybrid HeNB performing the access control in accordance with embodiment 6 of the present invention.

FIG. 8 is a flowchart of a hybrid HeNB performing the access control in accordance with embodiment 6 of the present invention. Referring to FIG. 8, when a non-CSG User Equipment (referred to as UE6) accessed to a hybrid HeNB needs to set up a new service to cause that the load of the hybrid HeNB reaches a load threshold and it is necessary for removing a non-CSG User Equipment, the detailed processing procedure includes the following steps.

Steps 801-802 are the same as steps 701-702 except for replacing UE5 by UE6.

Step 803: the MME detects the context information of UE6 according to the indication necessary for transferring a UE and a CSG ID carried by the uplink NAS transmission message; if there is not the CSG ID of the initial UE message in the accessible CSG identification list carried by the context information of UE6, the MME rejects UE6 to access a new service to the hybrid HeNB.

Step 804: the MME sends a service rejection message to UE6. The rejection reason is that, a non-CSG User Equipment is not allowed to access to access a new service by the resource of a hybrid HeNB or because the resource is limited.

It is an implementing mode that the MME sends a service rejection to UE6. The MME may also notify the hybrid HeNB of handovering UE6 to another accessible cell by use of the mode of FIG. 3, FIG. 5 and FIG. 7; UE6 may initiate a service request procedure in a new cell.

Various embodiments of mode 2 include the following embodiments 7-12.

Embodiment 7

Corresponding to a RRC connection set up procedure, the service condition of embodiment 7 is that, a User Equipment initially accesses to a hybrid HeNB, a User Equipment accessed to a hybrid HeNB requests a new service, or a User Equipment accessed to a hybrid HeNB requests to update its position; the hybrid HeNB acquires the information about whether each UE is a CSG User Equipment or a non-CSG User Equipment according to the indicating information reported by each UE, and performs the access control.

Figure 9:
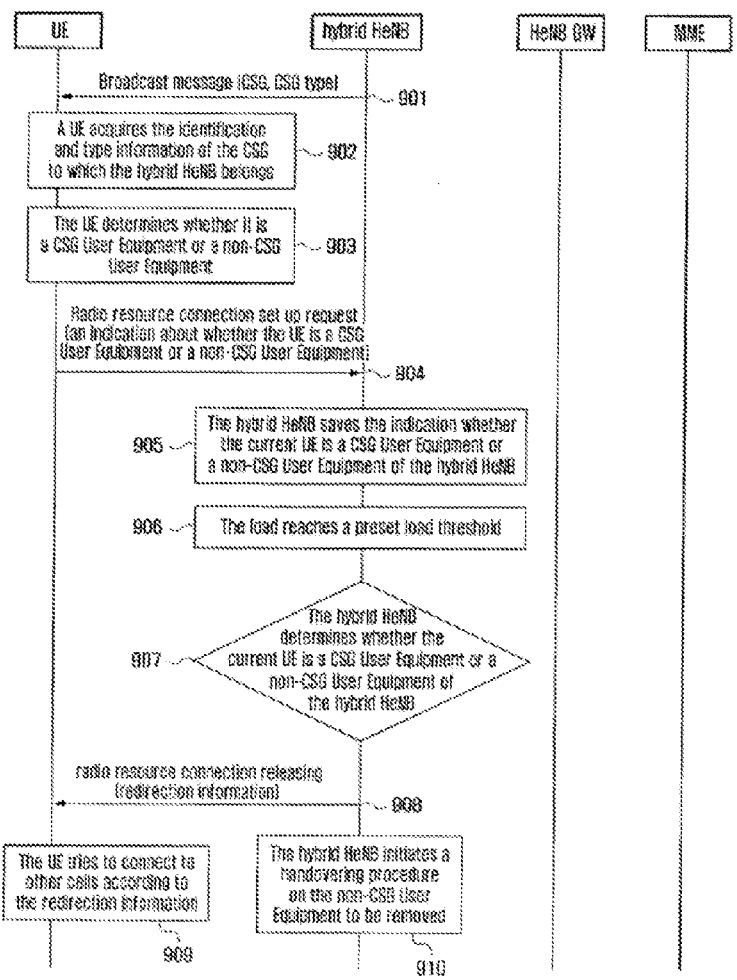
FIG. 9 is a flowchart of a hybrid HeNB performing the access control in accordance with embodiment 7 of the present invention.

FIG. 9 is a flowchart of a hybrid HeNB performing the access control in accordance with embodiment 7 of the present invention. Referring to FIG. 9, when each User Equipment initially accesses to a hybrid HeNB, a User Equipment accessed to a hybrid HeNB requests a new service, or a User Equipment accessed to a hybrid HeNB requests to update its position, the detailed access control processing procedure includes the following steps.

Step 901: a hybrid HeNB sends a broadcast message carrying the identification and type information of the CSG to which the hybrid HeNB belongs.

Step 902: a UE acquires the identification and type information, e.g. closed, opened or hybrid, of the CSG, to which the hybrid HeNB belongs, according to the broadcast message.

Step 903: the UE determines whether it is a CSG User Equipment or a non-CSG User Equipment of the hybrid HeNB according to its saved accessible CSG identification list and the acquired identification of the CSG to which the hybrid HeNB belongs.

In this step, if the accessible CSG identification list saved by the UE includes the identification of the CSG to which the hybrid HeNB belongs, the UE determines it is a CSG User Equipment of the hybrid HeNB; otherwise, the UE determines it is a non-CSG User Equipment of the hybrid HeNB.

Step 904: the UE sends a radio resource connection set up request carrying an indication about whether the UE is a CSG User Equipment or a non-CSG User Equipment.

Step 905: the hybrid HeNB saves the indication whether the UE is a CSG User Equipment or a non-CSG User Equipment according to the indication of the radio resource connection set up request.

In the above steps 904-905, when a UE reports the indication about whether it is a CSG User Equipment or a non-CSG User Equipment, it implements the reporting by carrying the indication in a radio resource connection set up request in the course of RRC connection set up procedure; in practical implementations, it may also implement the reporting procedure by carrying the indication in a newly-defined message or a measurement report sent from the UE to the hybrid HeNB.

After the above steps 901-905 are performed on each UE, the hybrid HeNB saves the indication information about whether various accessed UEs are CSG User Equipments or non-CSG User Equipments.

Step 906: the hybrid HeNB determines whether the current load reaches a preset load threshold or not; if the current load reaches a preset load threshold, proceed to step 907; otherwise, proceed to the existing access processing and terminate the current procedure.

Step 907: the hybrid HeNB determines whether the current UE is a CSG User Equipment or a non-CSG User Equipment of the hybrid HeNB; if the current UE is a non-CSG User Equipment, proceed to step 908; if the current UE is a CSG User Equipment, proceed to step 910.

Step 908: the hybrid HeNB rejects the access of the UE, and sends to the UE a RRC releasing message carrying the redirection information.

Step 909: the UE tries to connect to other cells according to the redirection information, and terminates the current procedure.

Step 910: the hybrid HeNB determines a non-CSG User Equipment to be removed according to its saved indicating information about whether other UEs are CSG User Equipments or non-CSG User Equipments, and initiates a handovering procedure on the non-CSG User Equipment.

Embodiment 8

Corresponding to a RRC connection set up procedure, the service condition of embodiment 8 is that, a User Equipment initially accesses to a hybrid HeNB, a User Equipment accessed to a hybrid HeNB requests a new service, or a User Equipment accessed to a hybrid HeNB requests to update its position; the hybrid HeNB acquires the information about whether each UE is a CSG User Equipment or a non-CSG User Equipment according to the indicating information delivered by an MME, and performs the access control.

Figure 10:
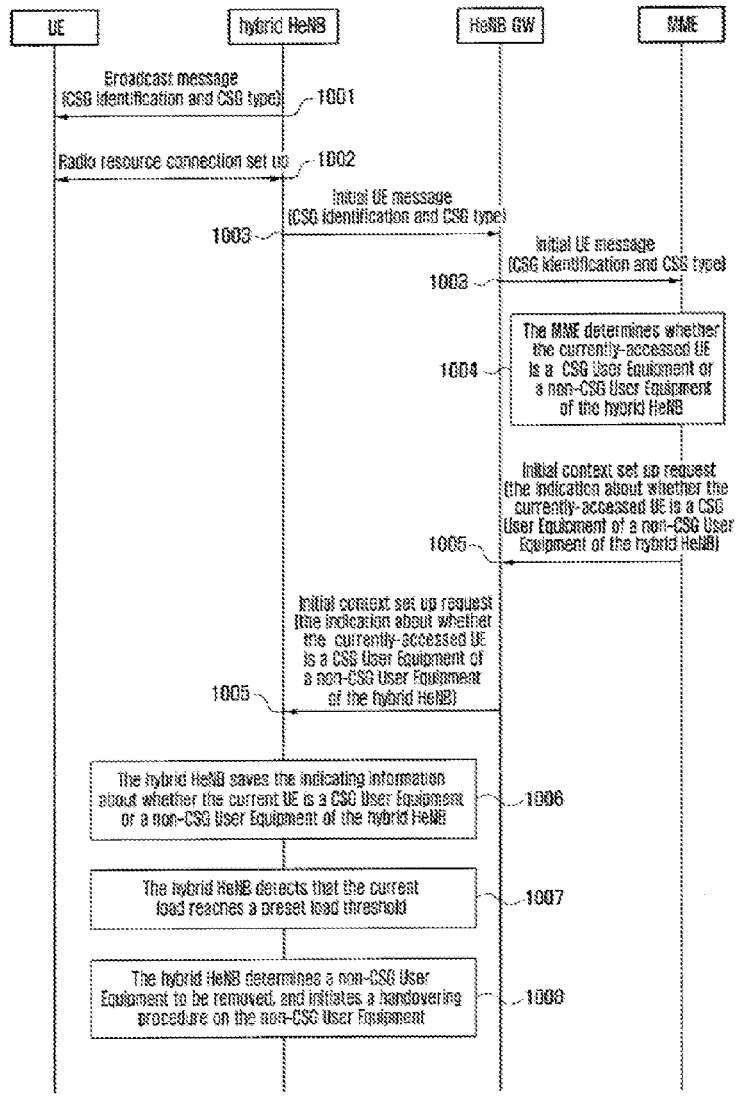
FIG. 10 is a flowchart of a hybrid HeNB performing the access control in accordance with embodiment 8 of the present invention.

FIG. 10 is a flowchart of a hybrid HeNB performing the access control in accordance with embodiment 8 of the present invention. Referring to FIG. 10, when each User Equipment initially accesses to a hybrid HeNB, a User Equipment accessed to a hybrid HeNB requests a new service, or a User Equipment accessed to a hybrid HeNB requests to update its position, the detailed access control processing procedure includes the following steps.

The procedure of Steps 1001-1002 is the same as the corresponding procedure in the prior art, which includes the following steps.

Step 1001: a hybrid HeNB sends a broadcast message carrying the identification and type information of the CSG to which the hybrid HeNB belongs.

Step 1002: radio resource set up procedure.

Step 1003: the hybrid HeNB sends to an MME an initial UE message carrying the identification and type information of the CSG to which the hybrid HeNB belongs.

When there is a HeNB GW, the initial UE message is forwarded to the MME.

Step 1004: the MME determines whether the currently-accessed UE is a CSG User Equipment or a non-CSG User Equipment of the hybrid HeNB according to its saved context information of the current UE and the CSG identification acquired from the initial UE message.

Step 1005: the MME sends to the hybrid HeNB an initial context set up request message or a newly-defined S1 message carrying the indication about whether the currently-accessed UE is a CSG User Equipment of a non-CSG User Equipment of the hybrid HeNB.

The HeNB GW is used for forwarding a message; it is needless to forward the message when there is not a HeNB GW.

Step 1006: the hybrid HeNB saves the indicating information about whether the current UE is a CSG User Equipment or a non-CSG User Equipment of the hybrid HeNB.

After the above steps 1001-1006 are performed on each UE, the hybrid HeNB saves the indication information about whether various accessed UEs are CSG User Equipments or non-CSG User Equipments.

Step 1007: the hybrid HeNB detects that the current load reaches a preset load threshold.

Step 1008: the hybrid HeNB determines a non-CSG User Equipment to be removed according to its saved indicating information about whether various UEs are CSG User Equipments or non-CSG User Equipments, and initiates a handovering procedure on the non-CSG User Equipment.

For example, if a UE, on which the connections of air port and S1 interface are set up, is a non-CSG User Equipment, the UE handovering procedure is triggered so as to transfer the UE to other cells. Alternatively, if the accessed UE is a HeNB User Equipment while other User Equipments connected to the HeNB are non-CSG User Equipments, the handovering procedure is triggered to transfer other UEs to other cells.

Embodiment 9

Corresponding to a dedicated beater activating procedure, the service condition of embodiment 9 is that, a UE has an activated service on a hybrid HeNB and it is necessary for triggering a new service, the hybrid HeNB acquires the information about whether each UE is a CSG User Equipment or a non-CSG User Equipment according to the indicating information reported by each UE, and performs the access control.

Figure 11:
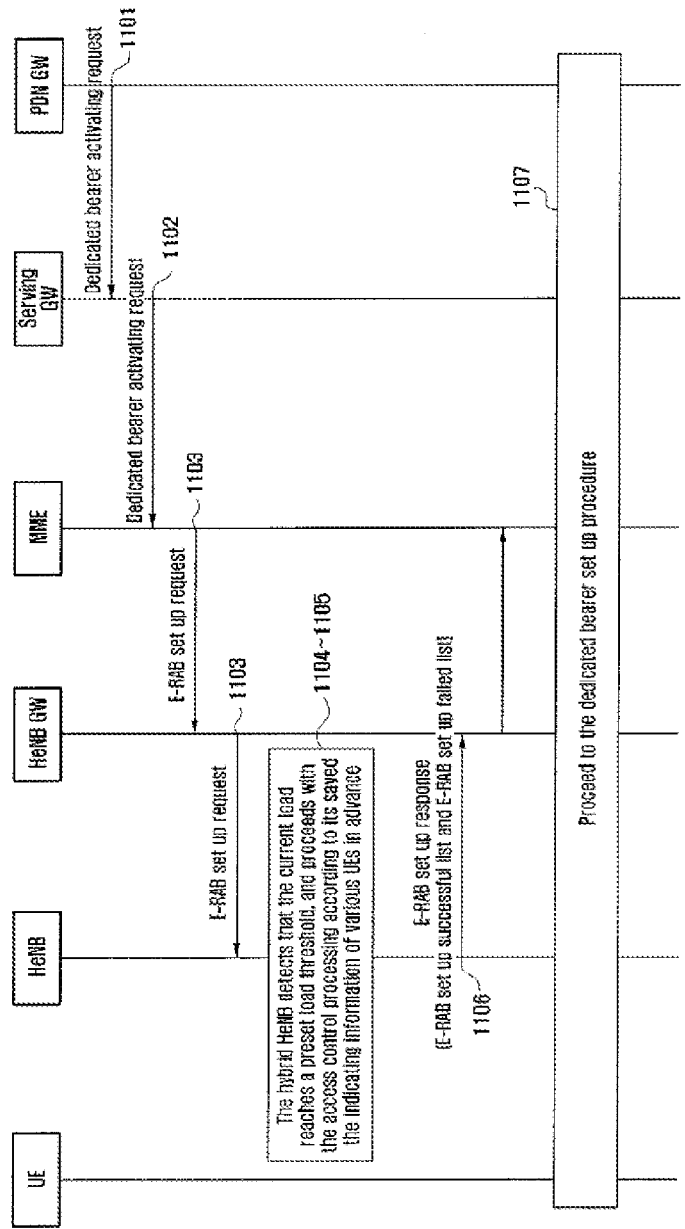
FIG. 11 is a flowchart of a hybrid HeNB performing the access control in accordance with embodiment 9 of the present invention.

FIG. 11 is a flowchart of a hybrid HeNB performing the access control in accordance with embodiment 9 of the present invention. Referring to FIG. 11, the detailed access control processing procedure includes the following steps.

The procedure of Steps 1101-1103 is the same as the corresponding procedure in the prior art, which includes the following steps.

Step 1101: a PDN GW sends a dedicated bearer activating request to a Serving GW.

Step 1102: the Serving GW sends a dedicated bearer activating request to an MME.

Step 1103: the MME sends an E-RAB set up request to a HeNB GW; the HeNB GW forwards the message to a hybrid HeNB.

When there is not a HeNB GW deployed, the message is sent directly to the hybrid HeNB.

Step 1104: the hybrid HeNB detects that the current load reaches a preset load threshold.

Step 1105: the hybrid HeNB proceeds with the access control processing according to its saved the indicating information of various UEs in advance.

In this step, the indicating information of various UEs saved by the hybrid HeNB may be acquired and saved by use of steps 901-905 in embodiment 7, or may be acquired and saved by use of steps 1001-1006 in embodiment 8.

The detailed implementation of this step includes the following conditions.

Condition 1: proceed to steps 1106-1107 to determine whether the setup of the bearer is successful or failed.

For example, if the UE is determined as a non-CSG User Equipment according to the indicating information of the UE currently activating a dedicated bearer request (i.e. the UE necessary for setting up a new service currently), the hybrid HeNB only can guarantee to activate a part of current bearers.

Step 1106: in the case of setting up multiple bearers, if the current load of HeNB is able to guarantee a part of bearers are set up successfully, a set up successful list and a set up failed list are indicated in an E-RAB set up response according to whether the UE is a User Equipment of the CSG or not. If the setups of all bearers are not guaranteed, a set up failed list is returned in the response message. The bearer set up failed reason may be added in the response message as required.

Step 1107: proceed to the dedicated bearer set up procedure.

Condition 2: reject the bearer set up request and trigger a handover procedure.

For example, if the UE is determined as a non-CSG User Equipment according to the indicating information of the UE currently activating a dedicated bearer request (i.e. the UE necessary for setting up a new service currently), the UE necessary for setting up a new service currently is transferred to other cells for continuing its service.

Condition 3: the HeNB sets up a bearer according to the bearer set up request while other UEs are handovered to other cells by triggering a handover procedure.

For example, if the UE is determined as a CSG User Equipment according to the indicating information of the UE currently activating a dedicated bearer request (i.e. the UE necessary for setting up a new service currently), the service priority of the UE is guaranteed; at the same time, a non-CSG User Equipment is determined according to the saved indicating information of other UEs, and other non-CSG User Equipments are transferred.

Embodiment 10

The service condition of embodiment 10 is that, how does a hybrid HeNB perform the access control on an accessed UE in the activation state.

Figure 12:
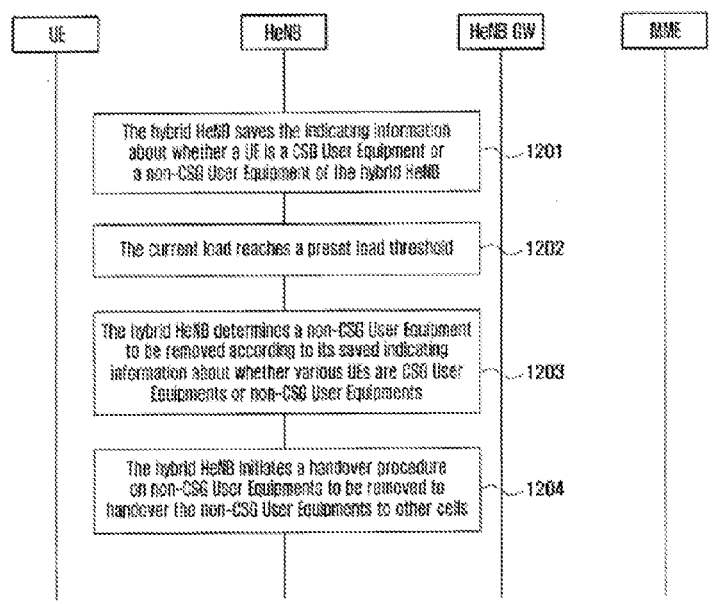
FIG. 12 is a flowchart of a hybrid HeNB performing the access control in accordance with embodiment 10 of the present invention.

FIG. 12 is a flowchart of a hybrid HeNB performing the access control in accordance with embodiment 10 of the present invention. Referring to FIG. 12, the detailed access control processing procedure includes the following steps.

Step 1201: the hybrid HeNB saves the indicating information about whether an activated UE is a CSG User Equipment or a non-CSG User Equipment of the hybrid HeNB.

In this step, the indicating information of various UEs saved by the hybrid HeNB may be acquired and saved by use of steps 901-905 in embodiment 7, or may be acquired and saved by use of steps 1001-1006 in embodiment 8.

Step 1202: the hybrid HeNB detects that the current load reaches a preset load threshold.

Step 1203: the hybrid HeNB determines a non-CSG User Equipment to be removed according to its saved indicating information about whether various UEs are CSG User Equipments or non-CSG User Equipments.

Step 1204: the hybrid HeNB initiates a handover procedure on non-CSG User Equipments to be removed to handover the non-CSG User Equipments to other cells.

Embodiment 11

The service condition of embodiment 11 is that, a UE is handovered from an eNB to a destination hybrid HeNB; the destination hybrid HeNB determines whether the UE is a CSG User Equipment or a non-CSG User Equipment of the destination hybrid HeNB according to the indicating information reported by the UE, and performs the access control.

Figure 13:
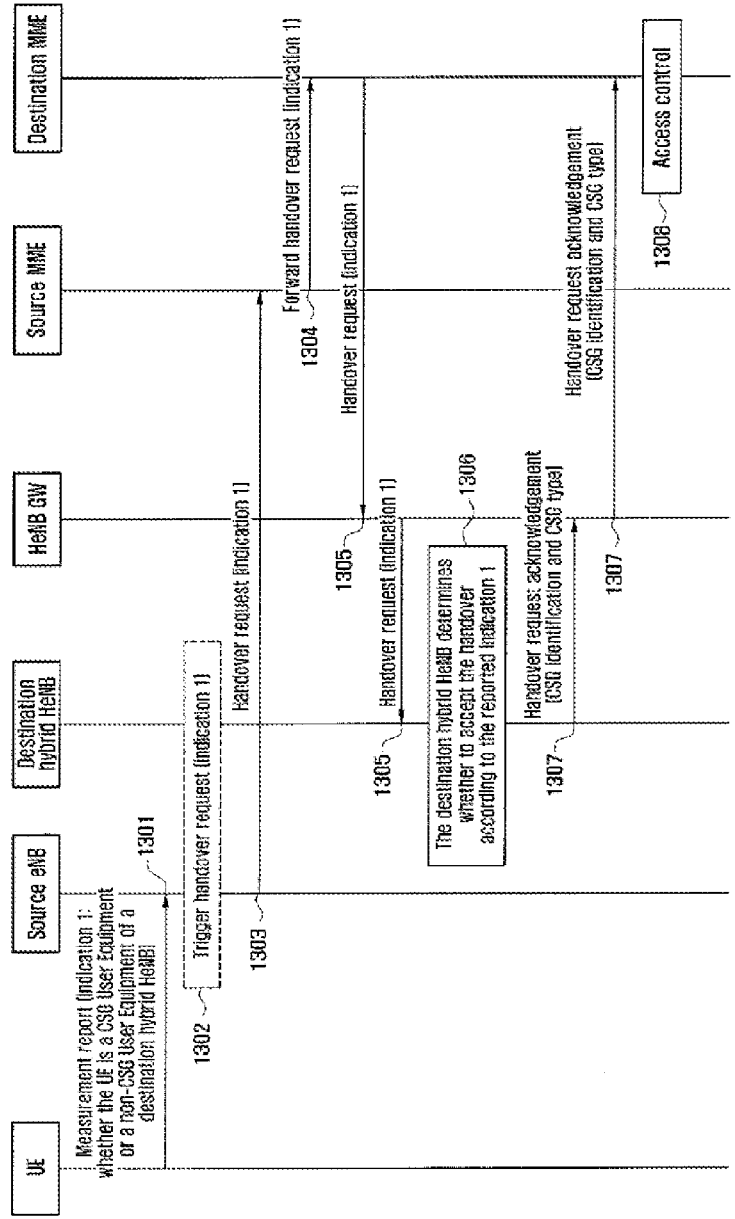
FIG. 13 is a flowchart of a hybrid HeNB performing the access control in accordance with embodiment 11 of the present invention.

FIG. 13 is a flowchart of a hybrid HeNB performing the access control in accordance with embodiment 11 of the present invention. Referring to FIG. 13, the detailed access control processing procedure includes the following steps.

Step 1301: before handovering, a UE sends to a source eNB a measurement report carrying the indication about whether the UE is a CSG User Equipment or a non-CSG User Equipment of a destination hybrid HeNB (to simplify the description, the indication is referred to as indication 1).

Herein, before initiating a handover, the UE measures the destination hybrid HeNB, and determines whether it is a CSG User Equipment or a non-CSG User Equipment of the destination hybrid HeNB according to its saved accessible CSG identification list and the measured identification of the CSG to which the destination hybrid HeNB belongs.

Step 1302: the source eNB sends to the destination hybrid HeNB a trigger handover request carrying indication 1.

Step 1303: the destination hybrid HeNB sends to a source MME a handover request carrying indication 1.

When there is a HeNB GW, the HeNB GW forwards the message to the source MME.

Step 1304: the source MME sends to a destination MME a forward handover request carrying indication 1.

Step 1305: the destination MME sends to the destination hybrid HeNB a handover request carrying indication 1.

When there is a HeNB GW, the request is forwarded.

Step 1306: the destination hybrid HeNB acquires the indicating information about whether the UE is a CSG User Equipment or a non-CSG User Equipment of the destination hybrid HeNB according to indication 1 of the received handover request, and determines whether to accept the handover according to its load condition; if the destination hybrid HeNB accept the handover, proceed to step 1307; otherwise, the destination hybrid HeNB sends a handover failed message to the destination MME to reject the handover directly, and terminates the current procedure.

In this step, the condition for rejecting the handover is that, the UE is a non-CSG User Equipment and the load of the hybrid HeNB reaches a preset load threshold.

Step 1307: return a handover request acknowledgement carrying the CSG identification and CSG type of the destination hybrid HeNB.

If there is a HeNB GW, the message is forwarded to the destination MME.

Step 1308: after receiving the message, the destination MME performs the access control acknowledgement again according to its saved identification list of the CSGs which are accessible to various UEs.

If indication 1 reported by the UE is unbelievable, a S1 releasing message is directly triggered to the destination hybrid HeNB, and the handover is failed;

If indication 1 reported by the UE is believable, the handover is performed continuously.

In this embodiment, though the UE needs to report indication 1 to help the hybrid HeNB for determining, the MME performs the reduplicative access control determination according to its saved contexts of various UEs (including the identification list of the CSGs those are accessible to UEs).

Embodiment 12

The service condition of embodiment 12 is that, a UE is handovered from an eNB to a destination hybrid HeNB; the destination hybrid HeNB determines whether the UE is a CSG User Equipment or a non-CSG User Equipment of the destination hybrid HeNB according to the indicating information delivered by a destination MME, and performs the access control.

Figure 14:
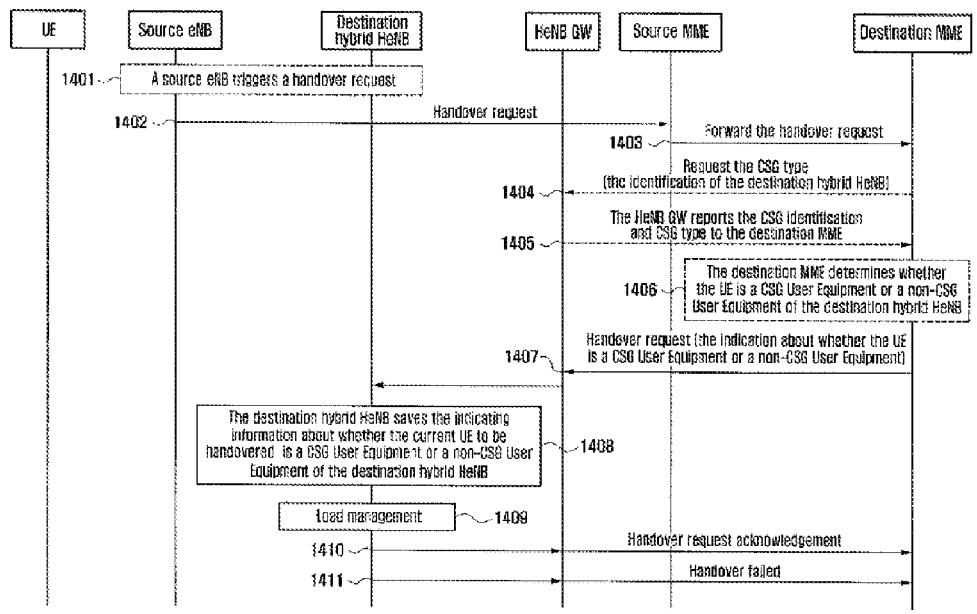
FIG. 14 is a flowchart of a hybrid HeNB performing the access control in accordance with embodiment 12 of the present invention.

FIG. 14 is a flowchart of a hybrid HeNB performing the access control in accordance with embodiment 12 of the present invention. Referring to FIG. 14, the detailed access control processing procedure includes the following steps.

Step 1401: a source eNB triggers a handover request.

Step 1402: the source eNB sends the handover request to a source MME.

Step 1403: the source MME forwards the handover request to a destination MME.

The procedure of steps 1401-1403 is the prior art.

Afterwards, the destination MME needs to acquire the identification and type of CSG of the destination hybrid HeNB, which includes the following implementation methods.

Method 1: when there is not a HeNB GW deployed, the destination MME may directly acquire the identification and type of CSG of the hybrid HeNB in advance by means of the logon procedure of the destination hybrid HeNB.

Method 2: when there is a HeNB GW deployed, the destination MME may directly acquire the identification and type of CSG of the hybrid HeNB in advance by means of the logon procedure of the destination hybrid HeNB.

Method 3: when there is a HeNB GW deployed, the HeNB GW acquires and saves the identification and type of CSG of the destination hybrid HeNB in advance; the destination MME acquires the identification and type of CSG of the hybrid HeNB by performing the method for inquiring the HeNB GW in steps 1404-1405, which can be implemented by means of a newly-defined S1 signaling.

Step 1404: the destination MME sends a request to the HeNB GW to request the identification and type of CSG of the destination hybrid HeNB; the request carries the identification of the destination hybrid HeNB.

Step 1404 is an optional step, which is performed only when the MME sends the request.

Step 1405: the HeNB GW reports the identification and type of CSG of the destination hybrid HeNB to the destination MME.

Step 1406: the destination MME determines whether the UE is a CSG User Equipment or a non-CSG User Equipment of the destination hybrid HeNB according to the acquired identification and type of CSG of the destination hybrid HeNB and the accessible CSG identification list of the context information of the UE to be handovered.

Step 1407: the destination MME sends to the destination hybrid HeNB a handover request indication carrying the indication about whether the UE is a CSG User Equipment or a non-CSG User Equipment.

Step 1408: the destination hybrid HeNB saves the indicating information about whether the current UE to be handovered is a CSG User Equipment or a non-CSG User Equipment of the destination hybrid HeNB.

Step 1409: the destination hybrid HeNB performs the load management, i.e. performing a determination according to its load condition and its saved indication about whether the current UE to be handovered is a CSG User Equipment or a non-CSG User Equipment; if the load allows the UE to access the destination hybrid HeNB, proceed to step 1410 and the handover request is acknowledged. If the load does not allow the UE to access the destination hybrid HeNB, proceed to step 1411 and the handover is failed.

Figure 15:
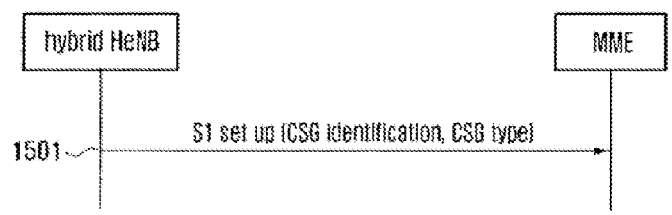
FIG. 15 is a flowchart of a method for an MME managing the identification and type of CSG of the connected hybrid HeNB in accordance with an embodiment of the present invention.

Referring to FIG. 15, the detailed procedure for implementing the above method 1 of the procedure as shown in FIG. 14 includes the following steps.

Step 1501: after it is turned on, a hybrid HeNB logs on an MME, and sends to the MME a S1 set up message carrying the identification and type of the CSG to which the hybrid HeNB belongs.

In this way, the destination MME may acquire the identification and type of the CSG, to which the hybrid HeNB belongs, from the S1 set up message.

Figure 16:
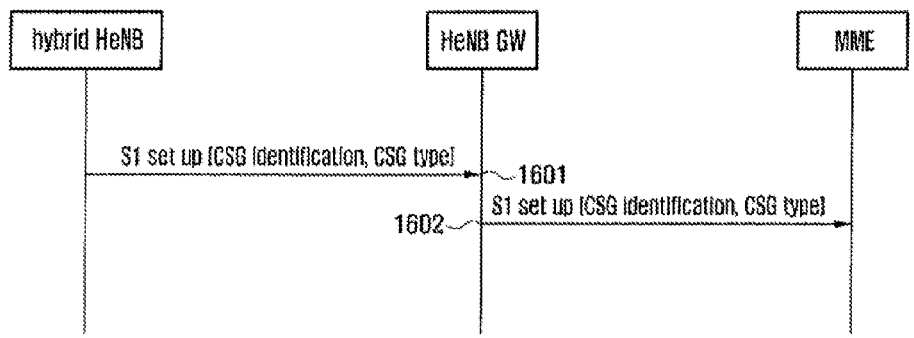
FIG. 16 is a flowchart of another method for an MME managing the identification and type of CSG of the connected hybrid HeNB in accordance with an embodiment of the present invention.

Referring to FIG. 16, the detailed procedure for implementing the above method 2 of the procedure as shown in FIG. 14 includes the following steps.

Step 1601: after it is turned on, a hybrid HeNB sends to a HeNB GW a S1 set up message carrying the identification and type of the CSG to which the hybrid HeNB belongs.

Step 1602: the HeNB GW sends to an MME a S1 set up message carrying the identification and type of the CSG to which the hybrid HeNB belongs.

In this way, the destination MME may acquire the identification and type of the CSG, to which the hybrid HeNB belongs, from the S1 set up message.

Figure 17:
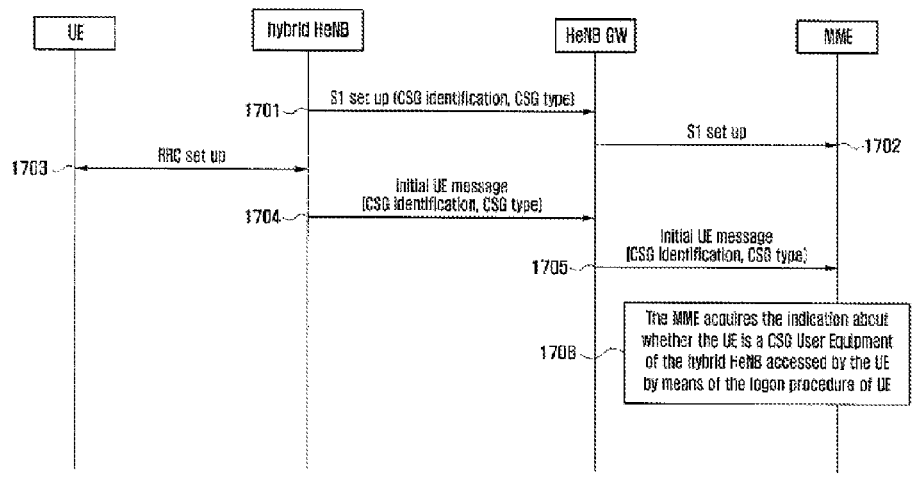
FIG. 17 is a flowchart of a method for a HeNB GW managing the identification and type of CSG of the connected hybrid HeNB in accordance with an embodiment of the present invention.

Referring to FIG. 17, in accordance with the above method 3 of the procedure as shown in FIG. 14, a HeNB GW acquires and saves the identification and type of CSG of a destination hybrid HeNB in advance and it is needless for an MME to manage the identification and type of CSG of the destination hybrid HeNB; the detailed procedure for the MME acquiring the indication about whether a UE is a CSG User Equipment by means of the UE logon procedure and other uplink messages includes the following steps.

Step 1701: after it is turned on, a hybrid HeNB sends to a HeNB GW a S1 set up message carrying the identification and type of the CSG to which the hybrid HeNB belongs.

In this way, the HeNB GW acquires the identification and type of the CSG to which the hybrid HeNB, connected to the HeNB GW, belongs.

Step 1702: the HeNB GW sends a S1 set up message to an MME.

Steps 1701-1702 are the logon procedure of the hybrid HeNB.

Steps 1703-1706 are the logon procedure of UE. The MME may also acquire the indication about whether the UE is a CSG User Equipment of the hybrid HeNB accessed by the UE by means of other uplink S1 messages.

Step 1703: the RRC between the UE and the hybrid HeNB is set up.

Step 1704: the hybrid HeNB sends to the HeNB GW an initial UE message carrying the identification and type information of the CSG to which the hybrid HeNB belongs.

Step 1705: the HeNB GW sends to the MME an initial UE message carrying the identification and type information of the CSG to which the hybrid HeNB belongs.

Step 1706: the MME acquires the indication about whether the UE is a CSG User Equipment of the hybrid HeNB accessed by the UE by means of the logon procedure of UE.

In addition, the present invention further provides a hybrid radio resource management entity, including:

a trigger module for detecting an access control trigger event, and sending a trigger notification to an information acquiring module after detecting the access control trigger event;

an information acquiring module for determining a non-CSG User Equipment to be removed after receiving a trigger notification, and sending the non-CSG User Equipment to be removed to a connection control module;

a connection control module for disconnecting the connection with the non-CSG User Equipment to be removed.

The trigger module is used for sending the trigger notification to the information acquiring module on detecting that the current load reaches a preset load threshold, detecting an event triggering to set up a connection and the current load reaches a preset load threshold, or detecting an external access control trigger indication.

Preferably, the information acquiring module is used for sending to a mobile management entity a first request carrying the identification of the CSG to which a hybrid radio resource management entity belongs, receiving a first notification sent by a mobile management entity, and determining a non-CSG User Equipment to be removed according to the non-CSG User Equipment to be removed carried by the first notification;

Further, the connection control module is used for disconnecting the connection with a part of non-CSG User Equipments to be removed according to the load condition of the hybrid radio resource management entity in which the connection control module resides.

In detail, when sending an initial UE message, handover request acknowledgement message or uplink NAS transmission message to the mobile management entity, the information acquiring module carries the identification of the CSG, to which the hybrid radio resource management entity belongs, in the above message; the information acquiring module receives a UE context releasing command sent by the mobile management entity, and determines the User Equipment to be accessed as a non-CSG User Equipment to be removed.

Preferably, the information acquiring module acquires the indicating information about whether each accessed User Equipment is a CSG User Equipment or a non-CSG User Equipment, and directly determines a non-CSG User Equipment to be removed according to the indicating information.

In detail, the information acquiring module acquires the indicating information about whether each accessed User Equipment is a CSG User Equipment or a non-CSG User Equipment according to the indicating information reported by each User Equipment or delivered by the mobile management entity.

In detail, the connection control module releases the connection with the non-CSG User Equipment to be removed, releases a part of bearer of the non-CSG User Equipment to be removed, or handovers the non-CSG User Equipment to be removed to other radio resource management entities.

In addition, the present invention further provides a system for performing the access control, including:

a hybrid radio resource management entity for sending to a mobile management entity a first request carrying the identification of the CSG to which the hybrid radio resource management entity belongs on detecting an access control trigger event, and disconnecting the connection with the non-CSG User Equipment to be removed according to the received non-CSG User Equipment to be removed;

a mobile management entity for determining a non-CSG User Equipment to be removed according to the CSG identification of the first request and the context of the User Equipment accessed to the hybrid radio resource management entity, and sending the non-CSG User Equipment to be removed to the hybrid radio resource management entity.

In addition, the present invention further provides another system for performing the access control, including:

a hybrid radio resource management entity for determining a non-CSG User Equipment to be removed according to the received indicating information about whether the User Equipment is a CSG User Equipment or a non-CSG User Equipment on detecting an access control trigger event, and disconnecting the connection with the non-CSG User Equipment to be removed;

a mobile management entity for acquiring the identification of the CSG to which the hybrid radio resource management entity belongs, determining whether each User Equipment is a CSG User Equipment or a non-CSG User Equipment of the hybrid radio resource management entity according to the acquired CSG identification and an identification list of the CSGs those are accessible to each User Equipment accessed to the hybrid radio resource management entity, and delivering to the hybrid radio resource management entity the determined indicating information about whether each User Equipment is a CSG User Equipment or a non-CSG User Equipment.

In detail, an implementation mode is that,

The hybrid radio resource management entity carries the identification of the CSG, to which the hybrid radio resource management belongs, on sending an initial UE message to the MME or on sending a logon message;

The mobile management entity acquires the identification of the CSG, to which the hybrid radio resource management belongs, from the initial UE message or the logon message.

Another implementation mode is that, the system further includes: a radio resource management entity gateway;

The hybrid radio resource management entity carries the identification of the CSG, to which the hybrid radio resource management belongs, on sending a logon message to the radio resource management entity gateway;

The radio resource management entity gateway acquires the identification of the CSG, to which the hybrid radio resource management belongs, from the logon message, sends the identification of the CSG, to which the hybrid radio resource management belongs, to the mobile management entity after receiving an inquiring request;

The mobile management entity is used for sending an inquiring request to the radio resource management entity gateway, and acquiring the identification of the CSG, to which the hybrid radio resource management belongs, sent by the radio resource management entity gateway.

In addition, the present invention further provides another system for performing the access control, including:

a hybrid radio resource management entity for determining a non-CSG User Equipment to be removed according to the received indicating information about whether the User Equipment is a CSG User Equipment or a non-CSG User Equipment on detecting an access control trigger event, and disconnecting the connection with the non-CSG User Equipment to be removed;

a User Equipment for determining whether it is a CSG User Equipment or a non-CSG User Equipment of the hybrid radio resource management entity according to its accessible CSG identification list and the identification of the CSG, to which the hybrid radio resource management entity belongs, delivered by the hybrid radio resource management entity, and reporting to the hybrid radio resource management entity the determined indicating information about whether it is a CSG User Equipment or a non-CSG User Equipment of the hybrid radio resource management entity.

It should be noted that, in all the above embodiments, if a LTE system includes a HeNB GW, all interactive information between an MME and a hybrid HeNB should be forwarded by means of the HeNB GW.

The scheme provided by the present invention may be applicable to any mobile communication system. Correspondingly, the hybrid radio resource management entity may be a radio resource management entity of any mobile communication system meeting the hybrid feature (i.e. capable of providing services to CSG User Equipments and non-CSG User Equipments); the mobile management entity may also be a mobile management entity of any mobile communication system. For example, the hybrid radio resource management entity may be a HeNB GW, HNB, HNB GW, eNB of LTE system and one of the above HeNBs described in the above embodiments; the mobile management entity may be an SGSN or an MME of LTE system.

To sum up, the foregoing are only preferred embodiments of the present invention and are not for use in limiting the protection scope thereof. Any modification, equivalent replacement and improvement made under the spirit and principle of the present invention should be included in the protection scope thereof.

What is claimed is:

1. A method by a base station in a wireless communication network, the method comprising:
    receiving a first message from a terminal;
    transmitting a second message including a closed subscription group identification (CSG ID) to a core network entity;
    receiving a third message including information indicating whether the terminal is a CSG member of the base station from the core network entity; and
    performing distinction for the terminal based on the third message.

2. The method of claim 1, wherein the performing of distinction comprises releasing a bearer for the terminal, if the terminal is not the CSG member of the base station.

3. The method of claim 1, wherein the performing of distinction comprises configuring a bearer for the terminal, if the terminal is the CSG member of the base station.

4. The method of claim 1, wherein the performing of distinction comprises transmitting, to the terminal, a fourth message including information indicating a handover of the terminal, if the terminal is not the CSG member of the base station.

5. The method of claim 1, wherein the performing of distinction comprises transmitting, to the terminal, a fourth message to disconnect the connection with terminal, if the terminal is not the CSG member of the base station.

6. The method of claim 1, wherein the base station uses a hybrid cell.

7. The method of claim 1, wherein the second message includes information on an access type.

8. The method of claim 7, wherein the access type indicates whether the base station is an opened subscriber group cell or a closed subscriber group cell or a hybrid cell.

9. The method of claim 1, wherein the first message is a non access stratum (NAS) message.

10. A base station in a wireless communication network, the base station comprising:
    a transceiver configured to transmit and receive a signal; and
    a controller configured to receive a first message from a terminal, to transmit a second message including a closed subscription group identification (CSG ID) to a core network entity, to receive a third message including information indicating whether the terminal is a CSG member of the base station from the core network entity and to perform distinction for the terminal based on the third message.

11. The base station of claim 10, wherein the controller is further configured to release a bearer for the terminal, if the terminal is not the CSG member of the base station.

12. The base station of claim 10, wherein the controller is further configured to configure a bearer for the terminal, if the terminal is the CSG member of the base station.

13. The base station of claim 10, wherein the controller is further configured to transmit, to the terminal, a fourth message including information indicating a handover of the terminal, if the terminal is not the CSG member of the base station.

14. The base station of claim 10, wherein the controller is further configured to transmit, to the terminal, a fourth message to disconnect the connection with terminal, if the terminal is not the CSG member of the base station.

15. The base station of claim 10, wherein the base station uses a hybrid cell.

16. The base station of claim 10, wherein the second message includes information on an access type.

17. The base station of claim 16, wherein the access type indicates whether the base station is an opened subscriber group cell or a closed subscriber group cell or a hybrid cell.

18. The base station of claim 10, wherein the first message is a non access stratum (NAS) message.

19. A method by a core network entity in a wireless communication network, the method comprising:
    receiving a first message including a closed subscription group identification (CSG ID) and a second message from a base station, the second message being transmitted from a terminal to the base station; and
    transmitting, to the base station, a third message including information indicating whether the terminal is a CSG member of the base station, wherein the third message is used for performing distinction for the terminal by the base station.

20. The method of claim 19, wherein the performing distinction comprises releasing a bearer for the terminal, if the terminal is not the CSG member of the base station.

21. The method of claim 19, wherein the performing distinction comprises configuring a bearer for the terminal, if the terminal is the CSG member of the base station.

22. The method of claim 19, wherein the performing distinction comprises transmitting, to the terminal, a fourth message including information indicating a handover of the terminal, if the terminal is not the CSG member of the base station.

23. The method of claim 19, wherein the base station uses a hybrid cell.

24. The method of claim 19, wherein the first message includes information on an access type, and
    wherein the access type indicates whether the base station is an opened subscriber group cell or a closed subscriber group cell or a hybrid cell.

25. The method of claim 19, wherein the second message is a non access stratum (NAS) message.

26. A core network entity in a wireless communication network, the core network entity comprising:
    a transceiver configured to transmit and receive a signal; and
    a controller configured to receive a first message including a closed subscription group identification (CSG ID) and a second message from a base station, the second message being transmitted from a terminal to the base station and to transmit, to the base station, a third message including information indicating whether the terminal is a CSG member of the base station,
    wherein the third message is used for performing distinction for the terminal by the base station.

27. The core network entity of claim 26, wherein the controller is further configured to release a bearer for the terminal, if the terminal is not the CSG member of the base station.

28. The core network entity of claim 26, wherein the controller is further configured to configure a bearer for the terminal, if the terminal is the CSG member of the base station.

29. The core network entity of claim 26, wherein the controller is further configured to transmit, to the terminal, a fourth message including information indicating a handover of the terminal, if the terminal is not the CSG member of the base station.

30. The core network entity of claim 26, wherein the base station uses a hybrid cell.

31. The core network entity of claim 26, wherein the first message includes information on an access type, and
wherein the access type indicates whether the base station is an opened subscriber group cell or a closed subscriber group cell or a hybrid cell.

32. The core network entity of claim 26, wherein the second message is a non access stratum (NAS) message.

33. A method by a terminal in a wireless communication network, the method comprising:
receiving a first message related to a load of a base station; and
transmitting a second message to the base station,
wherein a bearer for the terminal is released, if the terminal is not a closed subscription group (CSG) member of the base station, and
wherein whether the terminal is CSG member is determined by a core network node based on a third message received from the base station, the third message including a CSG identification (CSG ID) and the second message.

34. The method of claim 33,
wherein the bearer for the terminal is configured, if the terminal is the CSG member of the base station.

35. The method of claim 33, the method further comprising:
receiving a fourth message indicating a handover of the terminal, if the terminal is not the CSG member of the base station.

36. The method of claim 33, wherein the base station uses a hybrid cell.

37. The method of claim 33, wherein the third message includes information on an access type, and
wherein the access type indicates whether the base station is an opened subscriber group cell or a closed subscriber group cell or a hybrid cell.

38. The method of claim 33, wherein the first message is a non access stratum (NAS) message.

39. A terminal in a wireless communication network, the terminal comprising:
a transceiver configured to transmit and receive a signal; and
a controller configured to:
receive a first message related to a load of a base station, and
transmit a second message to the base station,
wherein a bearer for the terminal is released, if the terminal is not the CSG member of the base station, and
wherein whether the terminal is a closed subscription group (CSG) member is determined by a core network node based on a third message received from the base station, the third message including a CSG identification (CSG ID) and the second message.

40. The terminal of claim 39, wherein a bearer for the terminal is configured, if the terminal is the CSG member of the base station.

41. The terminal of claim 39, wherein the controller is further configured to receive a fourth message indicating a handover of the terminal, if the terminal is not the CSG member of the base station.

42. The terminal of claim 39, wherein the base station uses a hybrid cell.

43. The terminal of claim 39, wherein the third message includes information on an access type, and
wherein the access type indicates whether the base station is an opened subscriber group cell or a closed subscriber group cell or a hybrid cell.

44. The terminal of claim 39, wherein the first message is a non access stratum (NAS) message.

* * * * *